United States Patent [19]
Diehl

[11] Patent Number: 5,586,579
[45] Date of Patent: Dec. 24, 1996

[54] COMBINATION BALL VALVE AND PRESSURE RELIEF VALVE ASSEMBLY

[75] Inventor: Matthew D. Diehl, St. Albans, Vt.

[73] Assignee: Martin Marietta Corporation, Bethesda, Md.

[21] Appl. No.: 559,752

[22] Filed: Nov. 15, 1995

[51] Int. Cl.$^6$ ............................................. F16K 15/18
[52] U.S. Cl. .............................. 137/614.17; 137/493.8
[58] Field of Search ....................... 137/614.17, 614.16, 137/493.8, 493

[56] References Cited

U.S. PATENT DOCUMENTS

| | | | |
|---|---|---|---|
| 2,570,937 | 10/1951 | Gash | 137/493.8 |
| 3,146,792 | 9/1964 | Donnelly et al. | 137/614.17 |
| 3,363,650 | 1/1968 | Scaramucci | 137/614.17 |
| 4,736,771 | 4/1988 | McCafferty | 137/614.17 |
| 4,932,436 | 6/1990 | Kanemaru | 137/614.17 X |
| 5,373,868 | 12/1994 | Rodriquez | 137/614.17 |
| 5,437,307 | 8/1995 | Cianfrocca, II | 137/614.17 X |

*Primary Examiner*—Kevin Lee
*Attorney, Agent, or Firm*—Robert A. Cahill; Geoffrey H. Krauss

[57] ABSTRACT

To provide pressure relief in a fluid line of a fluidic circuit, the ball element of a shutoff valve incorporates a tube that is aligned with a pair of valve ports when the ball is in the closed valve position. A miniature check valve, positioned in the tube, operates, depending on its orientation, to check fluid flow through the tube between the valve ports in one direction and to vent fluid through the tube in the opposite direction in response to excessive fluid pressure. In an alternative embodiment, a pair of tubes are incorporated into the ball valve element, with the check valves therein oriented in opposed directions to provide bidirectional pressure relief between the valve ports.

11 Claims, 2 Drawing Sheets

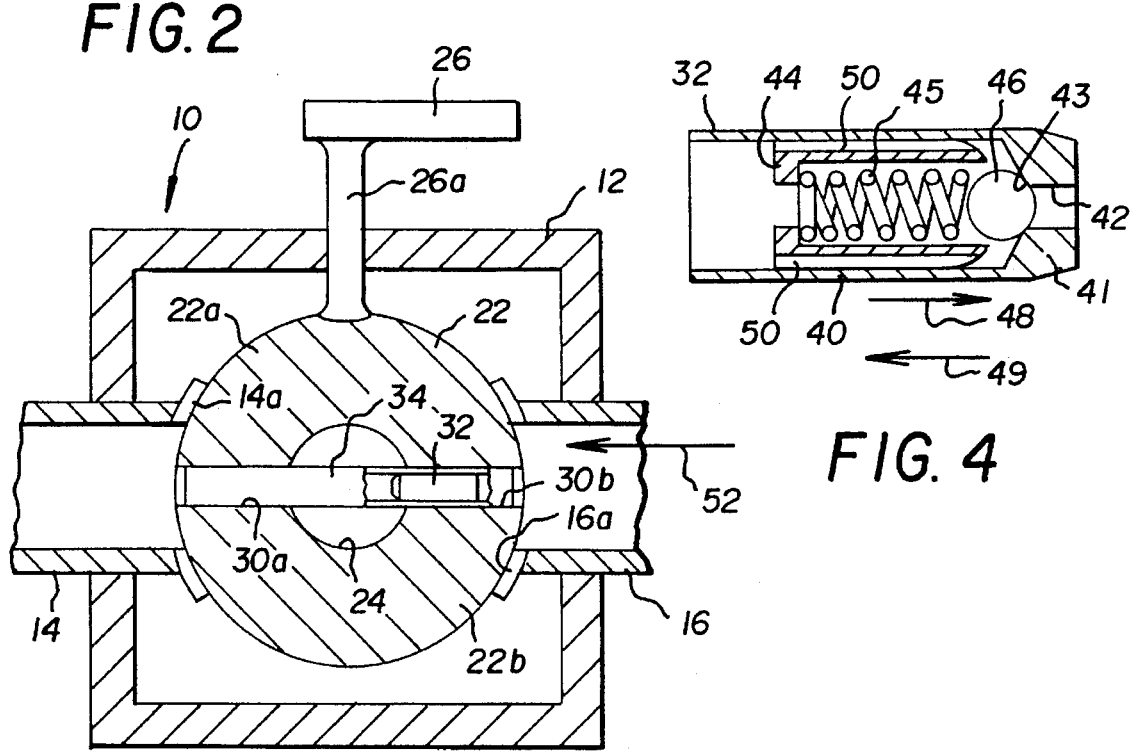

5,586,579

COMBINATION BALL VALVE AND PRESSURE RELIEF VALVE ASSEMBLY

FIELD OF THE INVENTION

The present invention relates to fluidic circuits and particularly to valve components used therein.

In numerous fluidic circuit applications, pressure relief capabilities must be incorporated in the fluid lines of the circuits closed to fluid flow in order to prevent damage, e.g., rupture, to system components caused by excessive fluid pressures in the lines. Such fluid pressures may result due to abnormal deviations in normal fluid operating pressures, or simply due to thermal expansion of the fluid in the lines.

To safely handle excessive fluid pressure conditions, traditional approaches are to add pressure accumulators, bladders, and the like, or separate relief valves to the fluid lines. Pressure accumulators and bladders are bulky and tend to leak. Relief valves, although effective, are typically installed to vent fluid from the lines, resulting in the escape of fluid from the circuit. In some circuit applications, the vented fluid must be replenished. If the fluid is of a hazardous nature, venting to the atmosphere could have harmful environmental consequences. In such cases, provisions must be made to safely recapture the vented fluids, such as incorporating relief valves in bypass lines connected in shunt with shutoff valves. Such provisions require additional space and added component costs.

SUMMARY OF THE INVENTION

To overcome the above-noted disadvantages and drawbacks of the prior art, and in accordance with the purpose of the invention, as embodied and broadly described, the present invention is embodied in a valve assembly comprising, in combination: first and second valve ports for connections into a fluid circuit; a valve element movable between a closed valve position sealing at least one of the first and second valve ports and an open valve position accommodating fluid flow between the first and second valve ports; and a relief valve incorporated in the valve element to permit pressure-relieving fluid flow between the first and second valve ports in response to excessive fluid pressure when the valve element is in the closed valve position.

It will be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated into and constitute a part of the specification, illustrate embodiments of the invention and, together with the description, serve to explain the objections, advantages, and principles of the invention.

In the drawings:

FIG. 1 is a sectional view of a valve assembly structured in accordance with the present invention, illustrated in its open valve position;

FIG. 2 is a sectional view along a plane 90° offset from the sectional view of FIG. 1 and illustrates the valve assembly of the present invention in its closed valve position;

FIG. 3 is a longitudinal sectional view of a relief valve subassembly utilized in the valve assembly of FIGS. 1 and 2;

FIG. 4 is an enlarged longitudinal sectional view of a relief valve included in the subassembly of FIG. 3;

Like reference numerals refer to corresponding parts throughout the several views of the drawings.

DETAILED DESCRIPTION OF THE PREFERRED EMBODIMENTS

Figure 5:
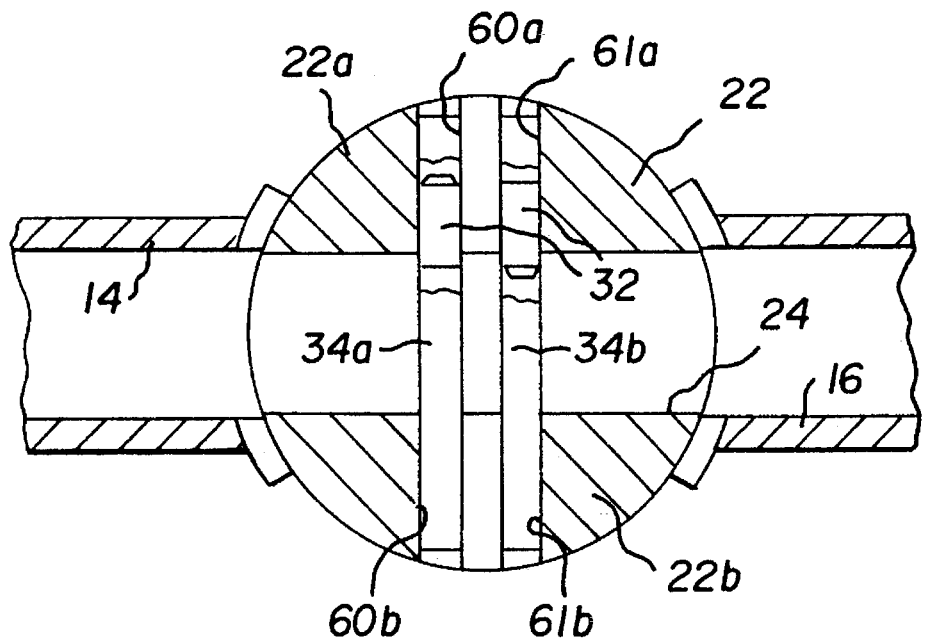
FIG. 5 is a sectional view of a valve assembly structured in accordance with an alternative embodiment of the invention, and illustrated in its open valve position.

A valve assembly according to one embodiment of the present invention, generally indicated at 10 in FIGS. 1 and 2, comprises a valve body, schematically indicated at 12, into which in-line first 14 and second 16 valve ports extend to inward terminations accommodating annular valve seats 14a and 16a, respectively. The outer ends of valve ports 14 and 16 are adapted, such as with screw threads 19, for serial connection into a fluid line, not shown. Rotatably mounted within valve body 12 is a valve element in the form of a ball 22. A diametrical passage 24 is formed through ball 22 to permit fluid flow communication between valve ports 14 and 16 when the ball is oriented in an open valve position with passage 24 aligned with valve ports 14 and 16, as seen in FIG. 1. In the closed valve position, diametrically opposed solid sections 22a and 22b of ball 22 assume positions illustrated in FIG. 2 in respective sealing engagements with valve seats 14a and 14b. A handle 26, connected to ball by stem 26a, is manually turned to rotate the ball in quarter turns between open and closed valve positions.

The foregoing description is representative of conventional ball valves, such as, for example, those available in a range of sizes from Asahi/America.

In accordance with the present invention, a hole is drilled through ball 22 to produce respective, diametrically aligned bores 30a and 30b through ball solid sections 22a and 22b. A miniature, pressure relief check valve 32 is fixedly positioned, such as by press-fit engagement, in a tube 34 to form a subassembly (FIG. 3), which, in turn, is fixedly positioned, such as by press-fit engagements, in the bores 30a and 30b in intersecting relation with passage 24. The tube may be formed of, for example, 316 stainless steel. If press-fit positioning is relied upon, the inner and outer surfaces of the tube should be polished to a smooth finish to ensure fluid-tight engagements both with the check valve 32 and bores 30a and 30b.

Check valve 32 may be of the construction illustrated in FIG. 4, and thus comprises a cartridge-style cylindrical body 40 having a closed end 41 in which is formed a central opening 42. The inner end of this opening is machined to provide an annular valve seat 43. A cylindrical keeper 44, press-fitted into body 40, backs a compression spring 45 acting to press a ball 46 into fluid-sealing engagement with valve seat 43.

It is seen that, by virtue of this construction, fluid flow through valve 32 in the direction of arrow 48 is inhibited (checked), while fluid flow in the direction of arrow 49 is permitted through opening 42 and a plurality of angularly spaced channels 50 cut into the periphery of keeper 44, when the fluid pressure is sufficient to overcome spring 45 and unseat ball 46. Valves suitable for application in the present invention are available in a range of sizes and cracking pressures from, for example, the Lee Company of Westbrook, Conn.

Returning to FIGS. 1 and 2, the subassembly of tube 34 and valve 32 is accommodated in ball 22 in the orientation to relieve excessive fluid pressure existing at valve port 14 and to check fluid flow in the direction of arrow 52, while ball 22 is in its closed valve position. It will be noted that, when valve 32 operates to relieve excessive fluid pressures, fluid is bled through tube 34 from valve port 14 to valve port 16. Thus, no fluid escapes the fluid circuit to pose environmental problems.

Figure 6:
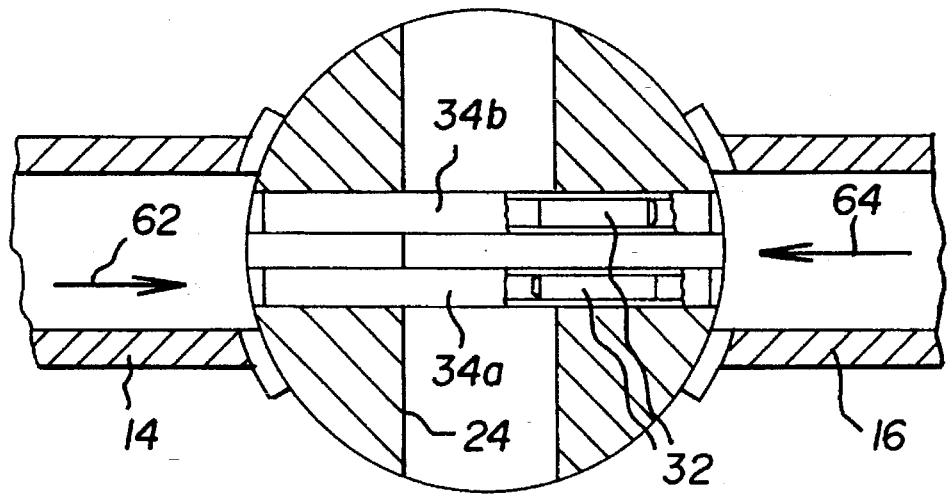
FIG. 6 is a sectional view illustrating the valve assembly of FIG. 5 in its closed valve position.

FIGS. 5 and 6 illustrate an alternative embodiment of the invention, wherein ball 22 is drilled with a pair of parallel holes to provide a pair of diametrically aligned bores 60*a*, 60*b* and 61*a*, 61*b* in solid ball sections 22*a* and 22*b*. A first valve-tube subassembly 34*a* is press-fitted into bores 60*a* and 60*b*, and a second valve-tube subassembly 34*b* is press-fitted into bores 61*a* and 61*b*. Valve 32 of subassembly 34*a* is oriented to bleed fluid in the direction of arrow 62 when excessive fluid pressures exist at valve port 14, while ball 22 is in its closed position seen in FIG. 6. Check valve 32 in the subassembly 34*b* is in a reverse flow orientation to bleed fluid in the direction of arrow 64 when excessive fluid pressures exist at port 16, again while valve ball 22 is in its closed valve position.

From the foregoing description, it is seen that the present invention provides a combination shutoff-pressure relief valve assembly of efficient, compact construction. While the present invention has been described in its application to ball valves, it will be appreciated that the invention may be applied to other types of shutoff valves.

It will be apparent to those skilled in the art that various modifications and variations can be made in the valve assembly of the present invention without departing from the spirit or scope of the invention. Thus, it is intended that the present invention cover the modifications and variations thereof, provided they come within the scope of the appended claims and their equivalents.

What is claimed is:

1. A valve assembly comprising, in combination:

first and second valve ports for connections into a fluid circuit;

a valve element movable between a closed valve position sealing at least one of the first and second valve ports and an open valve position accommodating fluid flow between the first and second valve ports; and a relief valve incorporated in the valve element to permit pressure-relieving fluid flow between the first and second valve ports in response to excessive valve fluid pressure when the valve element is in the closed valve position.

2. The valve assembly defined in claim 1, further comprising first and second relief valves incorporated in the valve element in reverse fluid flow orientations, the first relief valve operating to relieve excessive fluid pressure existing at the first valve port when the valve element is in the closed valve position, and the second relief valve operating to relieve excessive fluid pressure existing at the second valve port when the valve element is in the closed position.

3. The valve assembly defined in claim 1, wherein the valve element is a ball valve element including a through-passage accommodating fluid flow between the first and second valve ports when the valve element is in the open valve position and a valve section sealing the at least one first and second valve ports when the valve element is in the closed position, the relief valve being incorporated in the valve section.

4. The valve assembly defined in claim 3, wherein the through-passage is a diametrical bore, and the ball valve element includes diametrically opposed first and second valve sections at respective opposite sides of the diametrical bore, the first and second valve sections respectively sealing the first and second valve ports when the ball valve element is in the closed valve position, the relief valve being incorporated into the first and second valve sections.

5. The valve assembly defined in claim 4, further comprising first and second relief valves incorporated in the first and second valve sections in parallel relation and in reverse fluid flow orientations, the first relief valve operating to relieve excessive fluid pressure at the first valve port when the ball valve element is in the closed valve position, and the second relief valve operating to relieve excessive fluid pressure at the second valve port when the ball valve element is in the closed position.

6. The valve assembly defined in claim 4, further including a tube into which the relief valve is inserted, and the first and second valve sections include diametrically aligned bores through which the tube is inserted.

7. The valve assembly defined in claim 6, wherein the tube intersects the diametrical bore.

8. The valve assembly defined in claim 7, wherein the relief valve is retained in position by press-fit engagement with the tube, and the tube is retained in position by press-fit engagements with the diametrically aligned bores.

9. The valve assembly defined in claim 5, further including first and second tubes into which the first and second relief valves are respectively inserted, and the first and second valve sections include first and second pairs of diametrically aligned bores through which the first and second tubes are respectively inserted.

10. The valve assembly defined in claim 9, wherein the first and second tubes intersect the diametrical bore.

11. The valve assembly defined in claim 10, wherein the first and second relief valves are retained in position by respective press-fit engagements with the first and second tubes, and the first and second tubes are retained in positions by respective press-fit engagements with the first and second pairs of diametrically aligned bores.

\* \* \* \* \*